(12) United States Patent
Rudin

(10) Patent No.: US 8,810,715 B1
(45) Date of Patent: Aug. 19, 2014

(54) METHODS AND SYSTEMS FOR USER GUIDED AUTOMATIC EXPOSURE CONTROL

(76) Inventor: Seth A. Rudin, Danvers, MA (US)

( * ) Notice: Subject to any disclaimer, the term of this patent is extended or adjusted under 35 U.S.C. 154(b) by 0 days.

(21) Appl. No.: 13/451,612

(22) Filed: Apr. 20, 2012

(51) Int. Cl.
*H04N 5/235* (2006.01)
*G03B 7/00* (2014.01)

(52) U.S. Cl.
USPC ..... 348/362; 348/363; 348/221.1; 348/229.1; 348/222.1

(58) Field of Classification Search
USPC .......... 348/229.1, 362, 363, 221.1, 222.1
See application file for complete search history.

(56) References Cited

U.S. PATENT DOCUMENTS

| | | | |
|---|---|---|---|
| 4,751,542 A | 6/1988 | Madero | |
| 5,099,268 A | 3/1992 | O'Such et al. | |
| 5,124,741 A | 6/1992 | O'Such et al. | |
| 5,323,204 A | 6/1994 | Wheeler et al. | |
| 7,213,089 B2 * | 5/2007 | Hatakenaka | 710/65 |
| 7,218,353 B2 | 5/2007 | Wakabayashi | |
| 7,456,868 B2 | 11/2008 | Calderwood | |
| 2003/0098922 A1 * | 5/2003 | Barkan | 348/362 |
| 2003/0117519 A1 | 6/2003 | Wakabayashi | |
| 2005/0174589 A1 * | 8/2005 | Tokiwa | 358/1.9 |
| 2005/0212955 A1 | 9/2005 | Craig et al. | |
| 2006/0029382 A1 | 2/2006 | Uchida | |
| 2006/0187319 A1 * | 8/2006 | Teramoto et al. | 348/231.99 |
| 2007/0115386 A1 | 5/2007 | Wakabayashi | |
| 2007/0212055 A1 * | 9/2007 | Yoshida | 396/257 |
| 2007/0274702 A1 | 11/2007 | Wakabayashi | |
| 2008/0050111 A1 | 2/2008 | Lee et al. | |
| 2008/0174674 A1 | 7/2008 | Hsieh et al. | |
| 2008/0278629 A1 * | 11/2008 | Yamada et al. | 348/565 |
| 2008/0297622 A1 | 12/2008 | Miyashita | |
| 2009/0002544 A1 | 1/2009 | Montan | |
| 2009/0322899 A1 | 12/2009 | Chan et al. | |
| 2010/0066853 A1 | 3/2010 | Aoki et al. | |
| 2010/0201847 A1 | 8/2010 | Lee | |
| 2011/0064399 A1 | 3/2011 | Tohyama | |
| 2011/0227939 A1 * | 9/2011 | Inoue | 345/589 |
| 2011/0273589 A1 | 11/2011 | Mochimizo | |
| 2012/0008040 A1 | 1/2012 | Miyata | |
| 2012/0070084 A1 | 3/2012 | Yu | |
| 2012/0229654 A1 * | 9/2012 | Solomon | 348/207.1 |

OTHER PUBLICATIONS

Fujifilm, Digital Camera FinePix X100 Owner's Manual, BL01285-202 EN, p. 84, available at either http://fujifilm.com/products/digital_cameras/index.html or http://www.finepix-x100.com/, published on or before May 6, 2011.

Digital Photography Review article entitled 'An In-Depth Discussion of M + Auto-ISO for Canon SLRs', by 'ULTIMISTU', Published Oct. 6, 2001, available at http://www.dpreview.com/articles/0206161199/an-in-depth-discussion-of-m-auto-iso-for-canon-slrs.

Auto-ISO, by Mark Hamilton, Ohio Valley Camera Club of WV, available at http://www.ovccwv.org/documents/ PhotoTips/Auto%20ISO%20by%20Mark%20Hamilton.pdf, or via a link at http://www.ovccwv.org/WebPages/PhotographyTips/PhotographyTips.html, Published on or before Oct. 5, 2011.

Understanding ISO Sensitivity | When to Change ISO Settings, from nikonusa.com, available at http:/www.nikonusa.com/en/Learn-And-Explore/Article/g9mqnyb1/understanding-iso-sensitivity.html, Published on or before Oct. 12, 2012.

* cited by examiner

*Primary Examiner* — Antoinette Spinks

(57) ABSTRACT

In accordance with one or more embodiments of the invention, methods and systems for user guided automatic exposure control. Multiple sequential user settings for ordered choices of image capture settings and associated limit values are used to determine values of image capture settings including aperture, shutter speed, and ISO, such that a proper exposure is obtained within the guides set by a user.

20 Claims, 4 Drawing Sheets

Fig. 4

|   | Image Capture Setting | Upper Limit |
|---|---|---|
| 1 | Aperture | f/5.6 |
| 2 | ISO | 800 |
| 3 | Shutter Speed | 1/60 |

Fig. 5

|   | Image Capture Setting | Upper Limit |
|---|---|---|
| 1 | Aperture | f/5.6 |
| 2 | ISO | 1000 |
| 3 | Shutter Speed | 0.10x(1/IS-adjusted focal-length) |
| 4 | Aperture | f/4.0 |
| 5 | Shutter Speed | 0.25(1/IS-adjusted focal length) |
| 6 | ISO | 1600 |
| 7 | Shutter Speed | 0.50(1/IS-adjusted focal length) |
| 8 | Aperture | f/2.8 |
| 9 | ISO | 3200 |
| 10 | Shutter Speed | 1.0(1/IS-adjusted focal length) |

Fig. 6

|   | Image Capture Setting | Upper Limit |
|---|---|---|
| 1 | Aperture | f/5.6 |
| 2 | ISO | 1000 |
| 3 | ISO | 400 |
| 4 | Built-In Flash | 1/16 power |
| 5 | ISO | 800 |
| 6 | Shutter Speed | 1/60 |

METHODS AND SYSTEMS FOR USER GUIDED AUTOMATIC EXPOSURE CONTROL

BACKGROUND OF THE INVENTION

1. Field of Invention

The invention disclosed herein generally relates to methods and systems for user guided automatic exposure control. More specifically, the invention disclosed herein relates to methods and systems for allowing a user to control the order and amount by which exposure related image capture settings in an image capture device are changed when exposure is to be increased.

2. Description of Related Art

Image capture devices exist both in analog forms and in digital forms. Analog image capture devices generally use film as a pickup, while digital image capture devices generally use an image sensor as a pickup. Analog image capture devices using film can be loaded with various "speeds" of film, typically expressed in terms of the ISO (International Organization for Standardization) value of the film. Typically, slower film, that is film with a lower ISO number, will provide a higher resolution image capture. Faster film, that is film with a higher ISO number, by contrast, allows images to be captured at higher shutter speeds or in lower light conditions, but at the cost of image resolution or quality, often with the addition of grain in the image. Digital image capture devices generally use digital pickups rather than film. Examples of digital pickups include charged-coupled devices (CCDs), complementary metal-oxide-semiconductor (CMOS) sensors, or other suitable semiconductor devices that capture an optical image from a lens system and convert it into an electronic representation of that image.

In order for an image capture device to appropriately record images, the pickup, be it analog or digital, has to be exposed to a sufficient quantities and qualities of light. Image capture devices tend to have three primary factors that determine the amount and quality of light to which a pickup is exposed and the effect of that exposure. These are aperture, shutter speed, and ISO. The aperture is the opening in the lens through which light is allowed to travel en route to the pickup. The aperture is often controlled by a diaphragm that controls the effective diameter of a lens opening. A lens aperture is usually specified by an f-number, which represents the ratio of the focal length to the effective capture diameter. Typical f-numbers for lenses for image capture devices include 1.4, 2.0, 2.8, 4.0, 5.6, 8.0, 11.0, and 16.0. Other f-numbers can exist on both ends of this exemplary range (f-1.0 and f-22.0 for example), as well as inside this exemplary range (f-6.3 for example). A lower f-number denotes a greater aperture opening which allows more light to reach the pickup. The shutter speed represents the time that the shutter of an image capture device remains open while the device captures images. While ISO does not affect the amount of light to which a pickup is exposed, it does affect the sensitivity of the pickup to light.

Each of the above three main image capture settings has properties that affect the image capture when the respective setting is changed. Increasing the f-number, which reduces the aperture size, increases the depth of field. The depth of field describes the extent to which subject matter lying closer than or farther from the actual plane of focus appears to be in focus. Changes in the shutter speed alter the way movement appears in capture images. For example, very short shutter speeds can be used to freeze fast-moving subjects, while very long shutter speeds can be used to intentionally blur a moving subject. Changes in the ISO also affect the image capture. Higher ISO numbers mean that the pickup is more sensitive to light, but they also cause coarser film grain or higher image noise.

BRIEF SUMMARY OF EMBODIMENTS OF THE INVENTION

In accordance with one or more embodiments of the invention, methods and systems for user guided automatic exposure control are disclosed. Certain of the methods include the steps of: receiving data representative of a user setting for a first choice of image capture settings to be increased in order to achieve a proper exposure for image capture, said first choice of image capture settings being selected from a group comprising aperture, shutter speed, and ISO; receiving data representative of an upper limit value to which said first choice of image capture settings is to be increased; receiving data representative of a user setting for a second choice of image capture settings to be increased in order to achieve a proper exposure for image capture, said second choice of image capture settings being selected from said group comprising aperture, shutter speed, and ISO, said second choice of image capture settings to be increased being different from said first choice of image capture settings to be increased; receiving data representative of an upper limit value to which said second choice of image capture settings is to be increased; receiving data representative of a user setting for a third choice of image capture settings to be increased in order to achieve a proper exposure for image capture, said third choice of image capture settings being selected from said group comprising aperture, shutter speed, and ISO, said third choice of image capture settings to be adjusted being different from said second choice of image capture settings to be increased; receiving data representative of an upper limit value to which said third choice of image capture settings is to be increased; determining a proper exposure for a scene to be captured; and determining values of image capture settings for said scene to be captured, said image capture settings comprising aperture, shutter speed, and ISO, where said values of image capture settings are those that would result from increasing each respective image capture setting, up to each respective upper limit value corresponding to each image capture setting, sequentially from said first choice of image capture setting, to said second choice of image capture setting, to said third choice of image capture setting, and to any additional sequential choices of user-selected image capture settings, up to their respective upper limit values, in their respective order, until either a proper exposure would be attained or until each sequential choice of image capture setting has been set to its respective upper limit value.

Other of the methods include: capturing said scene to be captured according to said determined values of said image capture settings; at least one upper limit value to which a choice of image capture settings is to be increased is a function rather than a fixed value; at least one of said image capture settings relates to activating at least one flash unit; receiving at least one additional sequential choice of image capture settings to be increased, and receiving an upper limit value to which each respective at least one additional sequential choice of image capture settings to be increased is to be increased; more than one of said image capture settings to be increased are the same image capture setting; and receiving data representative of a lower limit value from which an associated choice of image capture settings is to be increased.

Certain of the systems include: an exposure system for determining a proper exposure for a scene to be captured; at least one memory; a user-selectable setting, stored in said at least one memory, for a first choice of image capture settings to be adjusted in order to achieve a proper exposure of said scene to be captured, said first choice of image capture settings being selected from a group comprising aperture, shutter speed, and ISO; a user-selectable upper limit value, stored in said at least one memory, to which said first choice of image capture settings to be adjusted is to be adjusted; a user-selectable setting, stored in said at least one memory, for a second choice of image capture settings to be adjusted in order to achieve a proper exposure of said scene to be captured, said second choice of image capture settings being selected from a group comprising aperture, shutter speed, and ISO; a user-selectable upper limit value, stored in said at least one memory, to which said second choice of image capture settings to be adjusted is to be adjusted; a user-selectable setting, stored in said at least one memory, for a third choice of image capture settings to be adjusted in order to achieve a proper exposure of said scene to be captured, said third choice of image capture settings being selected from a group comprising aperture, shutter speed, and ISO; a user-selectable upper limit value, stored in said at least one memory, to which said third choice of image capture settings to be adjusted is to be adjusted; control logic for determining values of image capture settings for said scene to be captured, said image capture settings comprising aperture, shutter speed, and ISO, where said values of image capture settings are those that would result from adjusting each respective image capture setting to each respective upper limit value corresponding to each image capture setting, sequentially from said first choice of image capture setting, to said second choice of image capture setting, to said third choice of image capture setting, and to any additional sequential choices of user-selected image capture settings, in their respective order, until either a proper exposure would be attained or until each sequential choice of image capture setting has been set to its respective upper limit value; one or more additional user-selectable settings, stored in said at least one memory, for subsequent choices of image capture settings to be adjusted in order to achieve a proper exposure of said scene to be captured, at least one of said one or more additional user-selectable settings being selected from a group comprising aperture, shutter speed, and ISO, and a user-selectable upper limit value, stored in said at least one memory, to which each respective one or more additional user-selectable image capture settings to be adjusted is to be adjusted.

Certain of the methods include: receiving data representative of a user setting for a first choice of image capture settings to be adjusted in order to achieve a proper exposure for image capture, said first choice of image capture settings being selected from a group comprising aperture, shutter speed, and ISO; receiving data representative of a limit value towards which said first choice of image capture settings is to be adjusted; receiving data representative of a user setting for a second choice of image capture settings to be adjusted in order to achieve a proper exposure for image capture, said second choice of image capture settings being selected from said group comprising aperture, shutter speed, and ISO; receiving data representative of a limit value towards which said second choice of image capture settings is to be adjusted; receiving data representative of a user setting for a third choice of image capture settings to be adjusted in order to achieve a proper exposure for image capture, said third choice of image capture settings being selected from said group comprising aperture, shutter speed, and ISO; receiving data representative of a limit value towards which said third choice of image capture settings is to be adjusted; receiving data representative of exposure information for a proper exposure for a scene to be captured; and determining values of image capture settings for said scene to be captured, said image capture settings comprising aperture, shutter speed, and ISO, where said values of image capture settings are those that would result from adjusting each respective image capture setting, from its current value towards each respective limit value corresponding to each image capture setting, sequentially from said first choice of image capture setting, to said second choice of image capture setting, to said third choice of image capture setting, and to any additional sequential choices of user-selected image capture settings, in their respective order, until either a proper exposure would be attained or until each sequential choice of image capture setting has been set to its respective limit value.

Other of the methods may include: capturing said scene to be captured according to said determined values of said image capture settings; receiving one or more additional sequential choices of image capture settings to be adjusted, and receiving associated limit values towards which each one or more additional sequential choices of image capture settings is to be adjusted; at least one limit value towards which a choice of image capture settings is to be adjusted is a function rather than a fixed value; at least one of said at least one limit value towards which a choice of image capture settings is to be adjusted is a function of at least one of the presence of an image-stabilization process and an effectiveness of an image-stabilization process; at least one of said at least one limit value towards which a choice of image capture settings is to be adjusted is a function of a focal length at which said image is to be captured; at least one image capture setting to be adjusted relates to exposure compensation; at least one of said image capture settings relate to activating at least one flash unit; at least one limit value of said at least one image capture settings relating to activating at least one flash unit relates to a power of a flash output; more than one of said image capture settings to be adjusted are the same image capture setting; and at least one choice of image capture settings to be adjusted is the same image capture setting as a previous choice of image capture settings to be adjusted, and wherein the limit value associated with said at least one choice of image capture settings is a lower value than the limit value associated with said previous choice of image capture settings to be adjusted.

BRIEF DESCRIPTION OF THE DRAWINGS

For a more complete understanding of various embodiments of the present invention, reference is now made to the following descriptions taken in connection with the accompanying drawings in which:

FIG. 4 illustrates data representative of simple exemplary user settings for ordered choices of image capture settings and associated upper limit values.

FIG. 5 illustrates data representative of complex exemplary user settings for ordered choices of image capture settings and associated upper limit values.

FIG. 6 illustrates data representative of exemplary user settings for ordered choices of image capture settings and associated upper limit values.

DETAILED DESCRIPTION OF THE PREFERRED EMBODIMENTS

Figure 1:
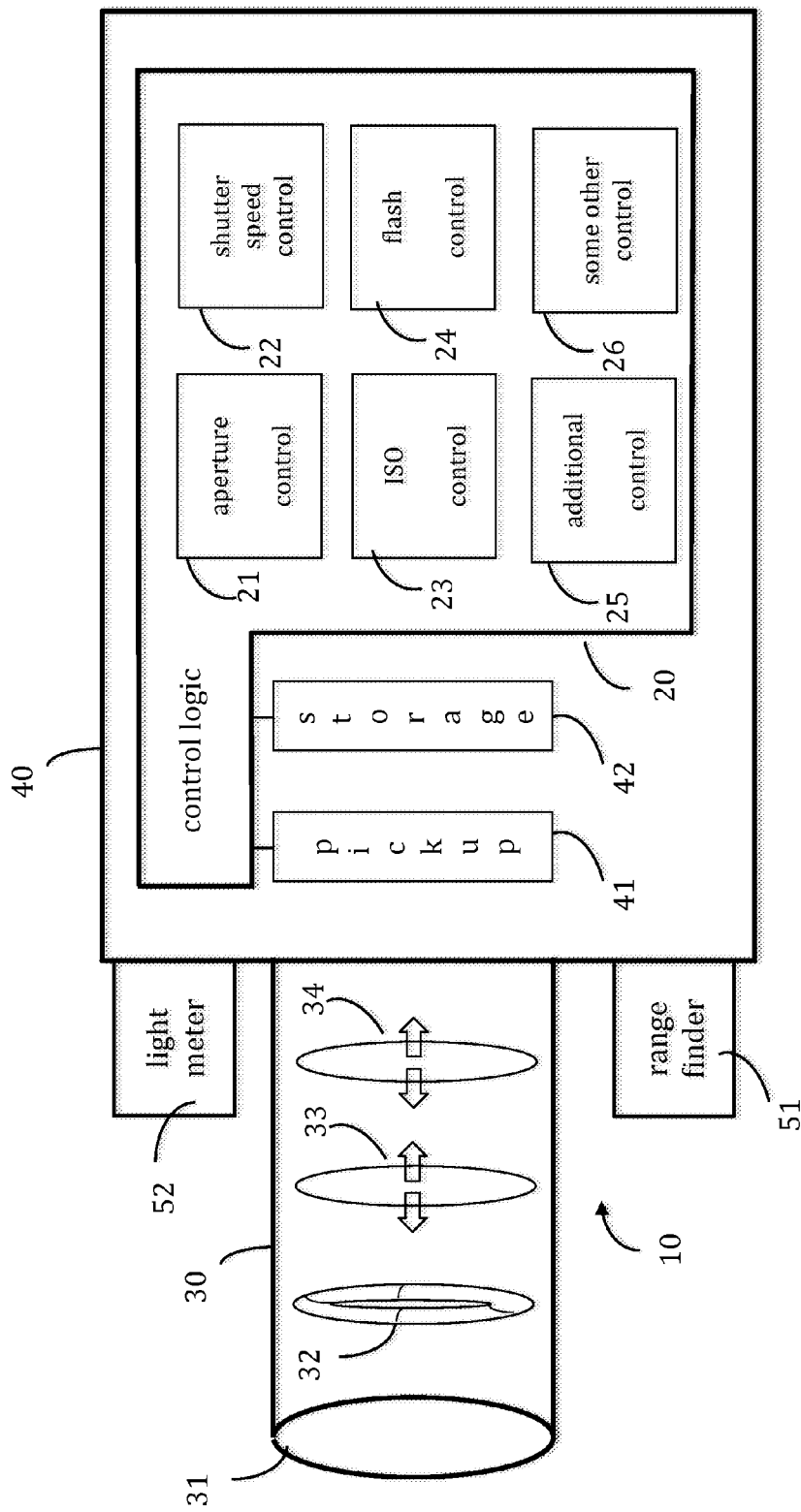
FIG. 1 illustrates a stylized block diagram of some components of an image capture device according to one or more embodiments.

FIG. 1 illustrates a stylized block diagram of some components of image capture device 10 according to one or more embodiments. Exemplary mage capture device 10 includes a lens assembly 30 and a body assembly 40. Lens assembly 30 can of course be permanently affixed to body assembly 40, or it can be removable as part of an interchangeable lens system. Lens assembly 30 can of course also be integral to body assembly 40. Lens assembly 30 is illustrated in simplified form, showing only a primary lens element 31, a moveable focus lens element 34, a moveable zoom lens element 33, and an adjustable iris aperture element 32. Actual lens systems are generally of course much more complex and perhaps quite different from the illustrated example, and the lens elements are illustrated in FIG. 1 in simplified form for ease of explanation of the principles of the invention.

Body assembly 40 optionally, and as illustrated, includes range finder 51. Range finder 51 can be any kind of appropriate range finder, including for example an infrared beacon and receiver or a split-lens or binocular range finder. Body assembly 40 optionally, but not illustrated, can include a flash mechanism, which can be an actual flash device, a hot shoe that provides a mount for an external flash, or ways to control, wired or wirelessly, external flash units, potentially includes slave flash units. Body assembly 40 optionally, but not illustrated, can also include buttons or other ways to zoom in and out, a shutter activation button, controls for adjusting any image capture settings, potentially including aperture, shutter speed, ISO, white balance, and color settings, by way of non-limiting examples. As illustrated, pickup 41 is situated so as to be in an optical path of lens assembly 30. Pickup 41 may be analog. Pickup 41 may be digital, such as a CCD sensor, a CMOS sensor, or another type of digital pickup. Lens assembly 31 may optionally include, not illustrated, a shutter element. A shutter element may also be implemented electronically, potentially via control of pickup 41.

One or more forms of analog or digital storage 42, may be included in or otherwise compatible with body assembly 40. Such storage may include CompactFlash, Secure Digital (SD), Memory Stick, SmartMedia, MicroDrive, or other suitable flash memory or other data storage device. Image capture device 10 may also include, as illustrated, light meter 52. Image capture device 10 may use pickup 41 for light metering.

Image capture device 10 includes control logic 20 that controls various operations of image capture device 10. Control logic 20 may be hardwired logic, or it may be software or firmware for execution by a processor, not illustrated, or other conventional means. Control logic 20 may include aperture control logic 21 for controlling image capture aperture, shutter speed control logic 22 for controlling image capture shutter speed, ISO control logic 23 for controlling image capture ISO, flash control logic 24 for controlling whether, for how long, and at what power level any flash is operated, additional control logic 25, and some other control logic 26 for controlling other aspects of image capture, for example zoom control logic for controlling a position of one or more zoom elements, focus control logic for controlling at least one focus lens element, logic for controlling or responding to an iris element of lens assembly 30, logic for controlling or responding to one or more shutter elements of lens assembly 30 or an equivalent implemented in pickup 41, logic for storing date and time, logic for performing image compression, logic for formatting storage, and logic for outputting captured images from storage 42 to an external device, possibly including a display, potentially external, potentially part of image capture device 10, by way of non-limiting examples.

Figure 2:
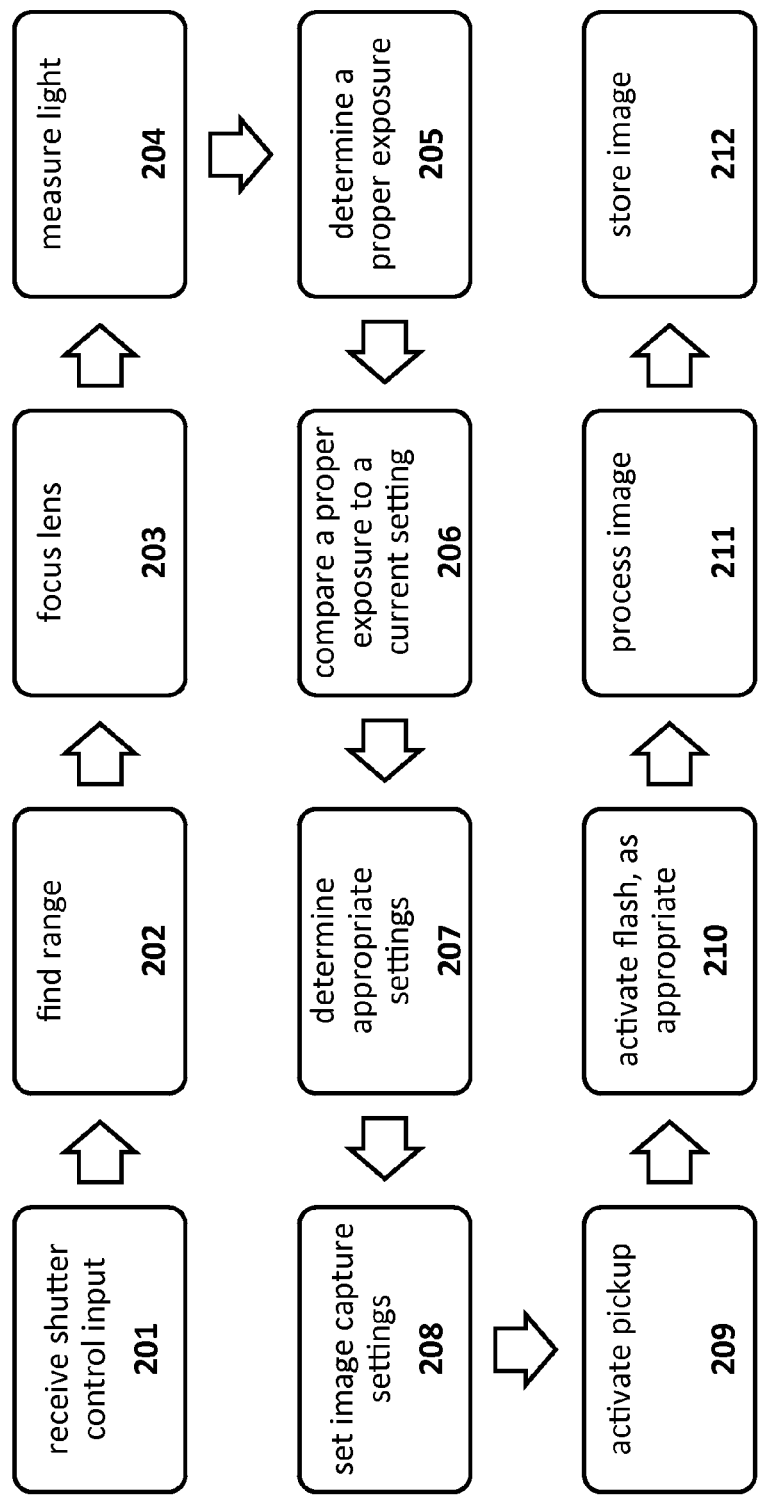
FIG. 2 illustrates one embodiment of methods and systems for user guided automatic exposure control.

FIG. 2 illustrates an embodiment of methods and systems for user guided automatic exposure control. Control logic 20 receives a shutter control input 201, such as a signal indicating a half-way press of a shutter button on image capture device 10. Focus control or other logic activates range finder 51 at step 202 to determine a distance to an object, an image of which is to be captured. At step 203, and in response to find range 202 and possibly other criteria, focus control logic focuses lens element 30. At step 204, flash control logic 24, possibly with other logic, measures ambient light in a scene to be imaged using light meter 52. At step 205, image capture device 10 determines a proper exposure, often based at least in part on finding the range 202 and measuring light 204. At optional step 206, image capture device 10 compares a proper exposure as determined in step 205 to one or more current settings on image capture device 10. At step 207, explained in more detail with respect to FIG. 3, image capture device 10 determines appropriate image capture settings based on user input. At step 208, image capture device 10 sets image capture settings, such as aperture, shutter speed, and ISO. At step 209, upon a full press of a shutter release, control logic 20 activates pickup 41 to begin capturing one or more images, and activates one or more flashes, as appropriate. At step 211, control logic 20 processes one or more captured images, such as by white-balancing, adjusting contrast, adjusting brightness, compressing, and so forth. At step 212, one or more processed images are stored in one or more memory.

Figure 3:
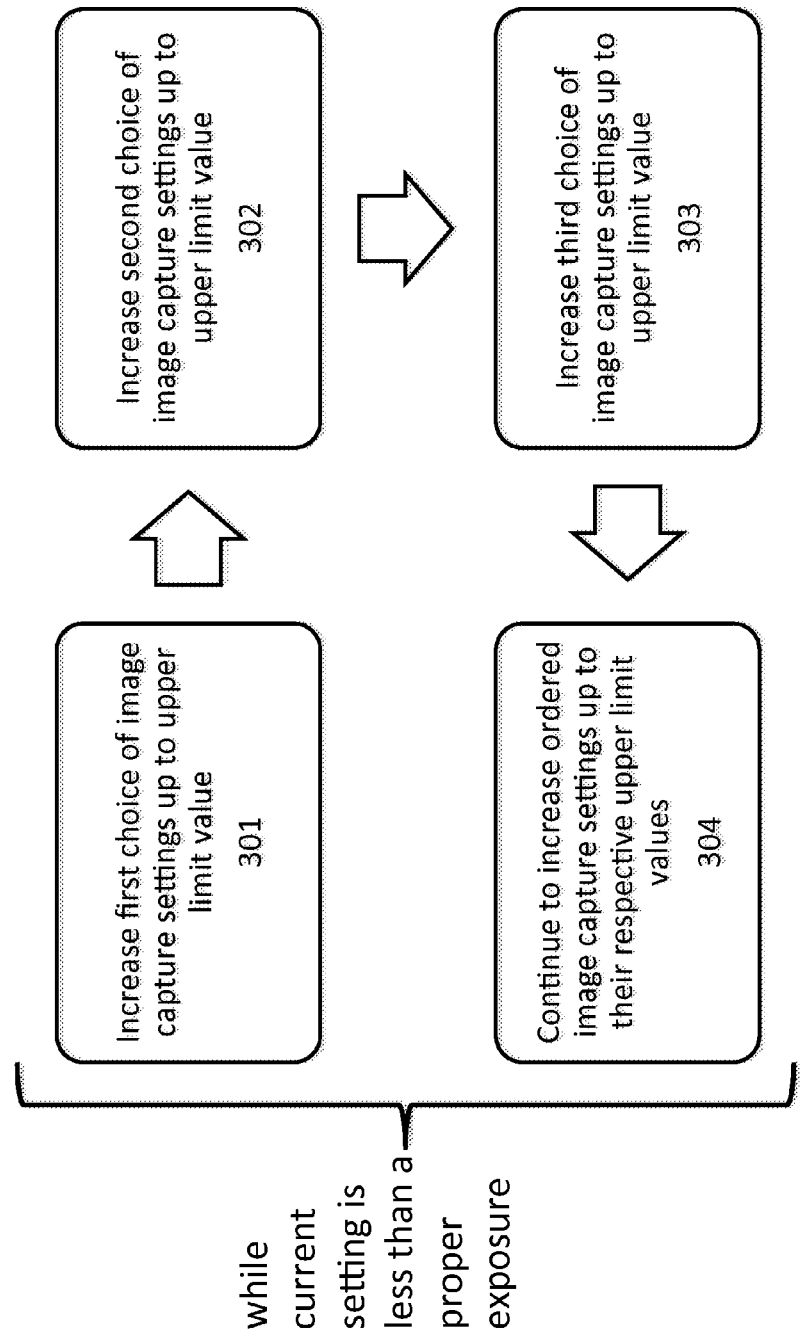
FIG. 3 illustrates an embodiment of methods and systems for user guided automatic exposure control.

FIG. 3 illustrates an embodiment of methods and systems for user guided automatic exposure control. Steps 301 through 304 are performed or simulated, to the extent necessary, and as indicated in FIG. 3, while a current setting is less than a proper exposure. That is, the steps illustrated in FIG. 3 may be simulated in order to determine a proper exposure. Once a proper exposure is determined, there may be no further need to increase the value of any of the image capture settings. So, while a current setting is less than a proper exposure, at step 301 the first choice of image capture settings is increased up to an upper limit value of the first choice of image capture settings to be adjusted. In step 302, also while a current setting is less than a proper exposure, the second choice of image capture settings is increased up to an upper limit value of the second choice of image capture settings to be adjusted. In step 303, also while a current setting is less than a proper exposure, the third choice of image capture settings is increased up to an upper limit value of the third choice of image capture settings to be adjusted. In step 304, also while a current setting is less than a proper exposure, successive ordered image capture settings are increased up to respective upper limit values of each ordered choice of image capture settings to be adjusted. The process illustrated in FIG. 3 generally ends in one of two situations. The first, and more common situation, is that proper exposure is determined to be reached by increasing ordered image capture settings up to their respective upper limit values, so that before all user-selected upper limit values for respective user choices of ordered image capture settings are reached, the image capture settings will combine to yield a proper exposure. The second, and less common situation, is that all user-selected image capture settings are increased to their respective user-selected upper limit values, and the resulting image capture settings are insufficient to yield a proper exposure. In such situations, several different outcomes are possible. In some embodiments, and preferably, user-selected image capture settings are set to their respective upper limit values, and one or more images are captured, even if under-exposed, at the maximum levels specified by the user. In other embodiments, once the user-selected upper limit values for each respective image capture setting is reached, a non-specified image capture setting may be changed, for example, if not otherwise specified, one or more flash units may fire. Of course, such action is not preferred.

FIG. 4 illustrates data representative of simple exemplary user settings for ordered choices of image capture settings and associated upper limit values. FIG. 4 illustrates a user setting for a first choice of image capture settings to be increased or adjusted of aperture, an associated upper limit value to which aperture is to be increased or adjusted of f/5.6, a second choice of image capture settings to be increased or adjusted of ISO, an associated upper limit value to which ISO is to be increased or adjusted of 800, a third choice of image capture settings to be increased or adjusted of shutter speed, and an associated upper limit value to which shutter speed is to be increased or adjusted of 1/60. It is to be noted that increasing the value of an image capture setting means changing that image capture setting such that an exposure is increased, and not necessarily that the numeric value of the image capture setting is increased. For example, aperture is not generally expressed as a numeric value, but rather as a so-called f-value. Increasing aperture could be, for example, changing aperture from f/8 to f/5.6 to f/4, etc. ISO generally increases with its value, that is to say that increasing the image capture setting for ISO may increase the ISO, for example, from 400 to 800 to 1600. Increasing the value of the image capture setting of shutter speed may be accomplished, for example, by changing the shutter speed from 1/320 of a second to 1/200 of a second, to 1/60 of a second. In order to result in a proper exposure, image capture settings for a scene to be captured are determined using the sequential image capture settings illustrated in FIG. 4 and their associated upper limit values. For example, to obtain a proper exposure, values of image capture settings would be chosen that would result from adjusting first aperture, up to a maximum aperture of f/5.6 if necessary, then adjusting ISO, up to a maximum ISO of 800 if necessary, then adjusting the shutter speed, up to a maximum shutter speed of 1/60 second. Of course, if adjusting the aperture to f/5.6 was sufficient to obtain a proper exposure, then it would not be necessary to adjust ISO or shutter speed. Likewise, if adjusting the aperture to f/5.6 was insufficient to obtain a proper exposure, but thereafter adjusting ISO to 600, which is less than the user-selected upper limit of ISO 800, was sufficient, then an aperture of f/5.6 and an ISO of 600 would be the determined values of the image capture settings that would produce a proper exposure. It is envisioned that in most cases, a proper exposure will be obtained before the last sequential user-selected image capture setting is increased to its respective upper limit value. This would ensure that the user has full control over the changes in image capture settings, with resulting control over the photographic properties such as motion blur, depth of field, and graininess that accompany the changes to the image capture settings. In this way, a user has more control over the resulting image than in current image capture systems, while allowing for proper exposure to be obtained.

FIG. 5 illustrates data representative of complex exemplary user settings for ordered choices of image capture settings and associated upper limit values. The upper limit values associated with the image capture settings of shutter speed in FIG. 5 illustrate upper limit values that are functions rather than fixed value. The upper limit values associated with the image capture settings of shutter speed in FIG. 5 particularly illustrate upper limit values that are functions of a focal length, and that may be functions of the effectiveness of an image-stabilization process. For example, a particular lens used may have an optional image stabilization feature that provides a certain number of stops of stabilization. Such a number, often in the range of two to four, but sometimes more or less than that range, may be input by a user, for example by inputting that a particular lens has an image stabilization effectiveness of three stops, or such effectiveness may be communicated to or determined by the image capture device in other ways.

As illustrated in FIG. 5, when values of image capture settings for a scene to be captured are determined, they are the values that would result from adjusting, until either a proper exposure would be attained or until each image capture setting was set to its respective limit value, first aperture up to a maximum of f/5.6 (for example, from f/8 to f/5.6, potentially with other gradations in between), then adjusting ISO towards 1000, then adjusting the shutter speed towards 0.10 times the inverse of the image-stabilization-adjusted focal length, then adjusting aperture towards a maximum of f/4.0, then adjusting shutter speed towards 0.25 times the inverse of the image-stabilization-adjusted focal length, then adjusting ISO towards 1600, then adjusting the shutter speed towards 0.50 times the inverse of the image-stabilization-adjusted focal length, then adjusting aperture towards f/2.8, then adjusting the ISO towards 3200, then adjusting the shutter speed towards 1.0 times the inverse of the image-stabilization-adjusted focal length. Of course, adjusting ISO from 1000 towards 1600, for example, does not necessarily mean simply changing the ISO from 1000 to 1600, but could mean increasing ISO from its previously set value, up until a maximum of 1600. If an appropriate exposure would be attained by increasing ISO to 1200, then 1200 would be the determined value of the image capture setting of ISO, and would subsequently be the ISO value at which the scene to be captured was captured. Referring still to FIG. 5, if increasing each user-selected image capture setting, here aperture, ISO, and shutter speed, to its respective upper limit value was insufficient to attain a proper exposure, and if the image capture device was set to not increase any user-selected image capture setting past the upper limit value that provides for the maximum exposure or the last sequential upper limit value, then the determined values of the image capture settings would be an aperture of f/2.8, an ISO of 3200, and a shutter speed of 1.0 times the inverse of the image-stabilization-adjusted focal length. It should be noted that image-stabilization-adjusted focal length factors in the effectiveness of an image stabilization process.

FIG. 6 illustrates data representative of exemplary user settings for ordered choices of image capture settings and associated upper limit values. FIG. 6 illustrates an image capture setting related to activating at least one flash unit. While the fourth image capture setting illustrated in FIG. 6 relates to a built-in flash, other image capture settings could relate to attached but not built-in flashes, wireless flashes, slave flash units, or other types of flash units. Flash is also different than image capture settings such as aperture, ISO, and shutter speed, as it presents an artificial source of increased exposure for a scene to be captured. When a user decides to add such an artificial source of light to a scene, the user may decide that one of the benefits thereto is the ability to reduce one or more others image capture settings. As illustrated in FIG. 6, when values of image capture settings for a scene to be captured are determined, they are the values that would result from adjusting, until either a proper exposure would be attained or until each image capture setting was set to its respective upper limit value, first aperture up to f/5.6 with the first image capture setting, then ISO up to 1000 with the second image capture setting. Because the user knows that the next selected way to increase an exposure is to add utilize a flash unit, the user wants to improve the ISO characteristics. So, the third change in image capture settings is adjusting the ISO to a maximum of 400. Because the second image capture setting would have adjusted the ISO to 1000, the third image capture setting brings the ISO down to 400 in anticipation of the fourth image capture setting. Of course, if ISO is increased to 1000 and still a sufficient exposure would not result, then decreasing ISO to 400 will not produce a sufficient exposure, and the image capture device is sure to execute the fourth image capture setting, which is activating the built-in flash and utilizing it up to an upper limit of $\frac{1}{16}$ of the full power available from the built-in flash. If this were insufficient to attain a proper exposure, the ISO would be adjusted up to 800, and then the shutter speed would be adjusted up to $\frac{1}{60}$ second, again as would be necessary to obtain a proper exposure.

As will be realized, the systems and methods disclosed herein are capable of other and different embodiments and its several details may be capable of modifications in various respects, all without departing from the invention as set forth in the appended claims. For example, the systems and methods disclosed herein might be used in so-called aperture priority mode, often abbreviated A or Av, or in so-called shutter priority mode, often abbreviated S or Tv. In aperture priority mode, a user selects a single aperture at which images are to be captured, and other image capture settings are adjusted as input by a user as the aperture remains constant. In shutter priority mode, a user selects a single shutter speed at which images are to be captured, and other image capture settings are adjusted as input by a user as the shutter speed remains constant. The disclosed systems and methods could also be used in manual mode, where a user inputs both the aperture and the shutter speed, each setting providing a starting point from which image capture settings would be adjusted based on user-input image capture settings and respective limits. The disclosed systems and methods could also function in a so-called fully automatic mode, where the image capture device determines appropriate image capture settings, again based on user-input image capture settings and respective limits. In modes in which one or more image capture settings are specified by a user, such as aperture priority mode or shutter priority mode, for example, values of image capture settings specified by the user are still said to be determined. So for example, if aperture priority mode is set, and the user sets the fixed aperture value to f/5.6, and the system determines, subject to the user's selected guides, that proper exposure would be obtained at an ISO of 800 and a shutter speed of $\frac{1}{320}$ second, then the determined values of the three image captures settings of aperture, ISO, and shutter speed would be f/5.6, 800, and $\frac{1}{320}$ second respectively. The system would then be said to have determined those values of the image capture settings, notwithstanding that the user input the fixed value of f/5.6 for the aperture.

Also to be noted is that the systems and methods herein disclosed can be applied to still image capture. The disclosed systems and methods can alternatively be applied to video capture. In video capture, the frame rate is generally held constant, often at 24p, 25p, or 30p, which represent approximately 23.976, 25, and 30 frames per second respectively. Other frame rates, such as 50i, 60i, 50p, 60p, or 72p, where the letter 'i' following the number indicates an interlaced format and where the letter 'p' following the number indicates a progressive format. When the systems and methods disclosed herein are applied to video, they are applied in a similar way in which they are applied to shutter priority mode as described above. As such, the frame rate would stay constant, but aperture, ISO, and other user-selected image capture settings could be adjusted for proper exposure as described above.

As described herein, image capture settings are adjusted in order to achieve a proper exposure for image capture. This does not necessarily mean that a proper exposure is achieved, but that the exposure gets closer to a proper exposure. In addition, a proper exposure need not be an ideal exposure or a perfect exposure, if such a thing were to exist. A proper exposure can be a better exposure or one that is sufficient given scene conditions and user-input constraints.

It will also be noted that when the values of the user-selected image capture settings are increased or otherwise adjusted in order to determine the values that would yield a proper exposure or that would maximize each selected image capture setting at its respective upper limit value, the image capture device need not actually change each image capture setting in order. Rather, the determined values are the values that would result from changing each sequential image capture setting, in order, to its respective limit. For example, if the image capture device determines that the image capture settings need to be adjusted so that the exposure increases by three stops, in can calculate which sequential image capture settings need to be adjusted and then change those settings to their determined values, the same values that would result from actually sequentially changing each image capture setting its according to its respective limits until a proper exposure were to obtain.

In some embodiments, a user may be allowed to store in a memory multiple series of image capture settings and respective limit values. Of course, lower limit values can be used in addition to upper limit values. An image capture device could be programmed to provide for multiple sets of image capture settings with respective limit values, and to capture multiple images with respective sets of settings and limit values. This could be implemented similar to auto-bracketing functions that capture images at bracketed intervals, for example of shutter speed. If a user stored five sets of settings and limit values, the user could set the image capture device to capture images with one or more than one set of settings and limit values, and could afterwards select one or more images from the resulting images.

Settings and limit values have herein been described as user guided, user-selected, user input, user selectable and user. All indicate a user's choice of the setting or limit value, without regard to how a user enters or selects such a setting or value. Settings could be selected from any sort of menu or list of options, and values could be entered via physical input, by speaking, by selecting, or any other way.

Accordingly, the drawings and description are to be regarded as illustrative in nature and not in a restrictive or limiting sense with the scope of the application being indicated in the claims.

What is claimed is:

1. A method comprising:
   receiving data representative of a user setting for a first choice of image capture settings to be increased in order to achieve a proper exposure for image capture, said first choice of image capture settings being selected from a group comprising aperture, shutter speed, and ISO;
   receiving data representative of an upper limit value to which said first choice of image capture settings is to be increased;
   receiving data representative of a user setting for a second choice of image capture settings to be increased in order to achieve a proper exposure for image capture, said second choice of image capture settings being selected from said group comprising aperture, shutter speed, and ISO, said second choice of image capture settings to be increased being different from said first choice of image capture settings to be increased;

receiving data representative of an upper limit value to which said second choice of image capture settings is to be increased;

receiving data representative of a user setting for a third choice of image capture settings to be increased in order to achieve a proper exposure for image capture, said third choice of image capture settings being selected from said group comprising aperture, shutter speed, and ISO, said third choice of image capture settings to be adjusted being different from said second choice of image capture settings to be increased;

receiving data representative of an upper limit value to which said third choice of image capture settings is to be increased;

determining a proper exposure for a scene to be captured; and determining values of image capture settings for said scene to be captured, said image capture settings comprising aperture, shutter speed, and ISO, where said values of image capture settings are those that would result from increasing each respective image capture setting, up to each respective upper limit value corresponding to each image capture setting, sequentially from said first choice of image capture setting, to said second choice of image capture setting, to said third choice of image capture setting, and to any additional sequential choices of user-selected image capture settings, up to their respective upper limit values, in their respective order, until either a proper exposure would be attained or until each sequential choice of image capture setting has been set to its respective upper limit value.

2. The method of claim 1, further comprising capturing said scene to be captured according to said determined values of said image capture settings.

3. The method of claim 1, wherein at least one upper limit value to which a choice of image capture settings is to be increased is a function rather than a fixed value.

4. The method of claim 1, wherein at least one of said image capture settings relates to activating at least one flash unit.

5. The method of claim 1, further comprising receiving at least one additional sequential choice of image capture settings to be increased, and receiving an upper limit value to which each respective at least one additional sequential choice of image capture settings to be increased is to be increased.

6. The method of claim 5, wherein more than one of said image capture settings to be increased are the same image capture setting.

7. The method of claim 1, further comprising receiving data representative of a lower limit value from which an associated image capture settings is to be increased.

8. An image capture device comprising:
an exposure system for determining a proper exposure for a scene to be captured;
at least one memory;
a user-selectable setting, stored in said at least one memory, for a first choice of image capture settings to be adjusted in order to achieve a proper exposure of said scene to be captured, said first choice of image capture settings being selected from a group comprising aperture, shutter speed, and ISO;

a user-selectable limit value, stored in said at least one memory, towards which said first choice of image capture settings to be adjusted is to be adjusted;
a user-selectable setting, stored in said at least one memory, for a second choice of image capture settings to be adjusted in order to achieve a proper exposure of said scene to be captured, said second choice of image capture settings being selected from a group comprising aperture, shutter speed, and ISO;
a user-selectable limit value, stored in said at least one memory, towards which said second choice of image capture settings to be adjusted is to be adjusted;
a user-selectable setting, stored in said at least one memory, for a third choice of image capture settings to be adjusted in order to achieve a proper exposure of said scene to be captured, said third choice of image capture settings being selected from a group comprising aperture, shutter speed, and ISO;
a user-selectable limit value, stored in said at least one memory, towards which said third choice of image capture settings to be adjusted is to be adjusted;
control logic for determining values of image capture settings for said scene to be captured, said image capture settings comprising aperture, shutter speed, and ISO, where said values of image capture settings are those that would result from adjusting each respective image capture setting towards each respective upper limit value corresponding to each image capture setting, sequentially from said first choice of image capture setting, to said second choice of image capture setting, to said third choice of image capture setting, and to any additional sequential choices of user-selected image capture settings, in their respective order, until either a proper exposure would be attained or until each sequential choice of image capture setting has been set to its respective upper limit value.

9. The device of claim 8, further comprising one or more additional user-selectable settings, stored in said at least one memory, for subsequent choices of image capture settings to be adjusted in order to achieve a proper exposure of said scene to be captured, at least one of said one or more additional user-selectable settings being selected from a group comprising aperture, shutter speed, and ISO, and a user-selectable limit value, stored in said at least one memory, towards which each respective one or more additional user-selectable image capture settings to be adjusted is to be adjusted.

10. A method comprising:
receiving data representative of a user setting for a first choice of image capture settings to be adjusted in order to achieve a proper exposure for image capture, said first choice of image capture settings being selected from a group comprising aperture, shutter speed, and ISO;
receiving data representative of a limit value towards which said first choice of image capture settings is to be adjusted;
receiving data representative of a user setting for a second choice of image capture settings to be adjusted in order to achieve a proper exposure for image capture, said second choice of image capture settings being selected from said group comprising aperture, shutter speed, and ISO;
receiving data representative of a limit value towards which said second choice of image capture settings is to be adjusted;
receiving data representative of a user setting for a third choice of image capture settings to be adjusted in order to achieve a proper exposure for image capture, said third choice of image capture settings being selected from said group comprising aperture, shutter speed, and ISO;

receiving data representative of a limit value towards which said third choice of image capture settings is to be adjusted;

receiving data representative of exposure information for a proper exposure for a scene to be captured; and determining values of image capture settings for said scene to be captured, said image capture settings comprising aperture, shutter speed, and ISO, where said values of image capture settings are those that would result from adjusting each respective image capture setting, from its current value towards each respective limit value corresponding to each image capture setting, sequentially from said first choice of image capture setting, to said second choice of image capture setting, to said third choice of image capture setting, and to any additional sequential choices of user-selected image capture settings, in their respective order, until either a proper exposure would be attained or until each sequential choice of image capture setting has been set to its respective limit value.

11. The method of claim 10, further comprising capturing said scene to be captured according to said determined values of said image capture settings.

12. The method of claim 10, further comprising receiving one or more additional sequential choices of image capture settings to be adjusted, and receiving associated limit values towards which each one or more additional sequential choices of image capture settings is to be adjusted.

13. The method of claim 10, wherein at least one limit value towards which a choice of image capture settings is to be adjusted is a function rather than a fixed value.

14. The method of claim 13, wherein at least one of said at least one limit value towards which a choice of image capture settings is to be adjusted is a function of at least one of the presence of an image-stabilization process and an effectiveness of an image-stabilization process.

15. The method of claim 13, wherein at least one of said at least one limit value towards which a choice of image capture settings is to be adjusted is a function of a focal length at which said image is to be captured.

16. The method of claim 12, wherein at least one image capture setting to be adjusted relates to exposure compensation.

17. The method of claim 10, wherein at least one of said image capture settings relate to activating at least one flash unit.

18. The method of claim 17, wherein at least one limit value of said at least one image capture settings relating to activating at least one flash unit relates to a power of a flash output.

19. The method of claim 10, wherein more than one of said image capture settings to be adjusted are the same image capture setting.

20. The method of claim 19, wherein at least one choice of image capture settings to be adjusted is the same image capture setting as a previous choice of image capture settings to be adjusted, and wherein the limit values associated with said at least one choice of image capture settings is a lower value than the limit value associated with said previous choice of image capture settings to be adjusted.

* * * * *